United States Patent
Garbagnati

(10) Patent No.: US 7,338,399 B2
(45) Date of Patent: Mar. 4, 2008

(54) CHAIN POWER-TRANSMISSION SYSTEM WITH MECHANICAL TIGHTENER

(75) Inventor: Carlo Garbagnati, Castello Brianza (IT)

(73) Assignee: Regina S.I.C.C. S.p.A., Milan (IT)

( * ) Notice: Subject to any disclaimer, the term of this patent is extended or adjusted under 35 U.S.C. 154(b) by 605 days.

(21) Appl. No.: 10/910,608

(22) Filed: Aug. 4, 2004

(65) Prior Publication Data
US 2005/0032595 A1     Feb. 10, 2005

(30) Foreign Application Priority Data
Aug. 8, 2003   (IT) .......................... MI2003A1644

(51) Int. Cl.
*F16H 7/18*   (2006.01)
*F16H 7/08*   (2006.01)

(52) U.S. Cl. ...................................... 474/111; 474/140

(58) Field of Classification Search ................ 474/111, 474/140, 114–117, 101, 109
See application file for complete search history.

(56) References Cited

U.S. PATENT DOCUMENTS

| | | | | |
|---|---|---|---|---|
| 3,117,463 A | * | 1/1964 | Brindle | ....................... 474/111 |
| 3,426,606 A | | 2/1969 | Hopkins | ....................... 74/242 |
| 3,463,025 A | * | 8/1969 | Poyser et al. | ................ 474/111 |
| 3,830,114 A | * | 8/1974 | Daines | ........................ 474/111 |
| 4,395,250 A | * | 7/1983 | King | ........................... 474/111 |
| 4,395,251 A | * | 7/1983 | King et al. | .................. 474/140 |
| 4,505,691 A | | 3/1985 | Kohler | ....................... 474/101 |
| 5,730,674 A | * | 3/1998 | Ott | ............................... 474/111 |
| 6,849,015 B2 | * | 2/2005 | Markley et al. | ............ 474/140 |

FOREIGN PATENT DOCUMENTS

| | | | | |
|---|---|---|---|---|
| EP | 0113685 A | * | 7/1984 | .................. 474/111 |
| EP | 0915268 A1 | | 5/1999 | |
| JP | 57-25556 A | * | 2/1982 | .................. 474/111 |
| JP | 58-200841 A | * | 11/1983 | .................. 474/111 |

* cited by examiner

*Primary Examiner*—Marcus Charles
(74) *Attorney, Agent, or Firm*—Jacobson Holman PLLC

(57) ABSTRACT

A mechanical power-transmission system with chain including a mechanical tightener acting on a branch of the chain and having in turn a base, a tightening shoe in dragging contact with the chain and a sliding wedge under the thrust of a first spring in an irreversible manner between the base and the shoe to cause progressive withdrawal of the base and the shoe in the tightening direction of the chain so that between the wedge and the shoe there is an elastic thrust member for thrusting the shoe in the tightening direction.

10 Claims, 3 Drawing Sheets

CHAIN POWER-TRANSMISSION SYSTEM WITH MECHANICAL TIGHTENER

BACKGROUND OF THE INVENTION

1. Field of the Invention

The present invention relates to a chain power-transmission system with mechanical tightener.

2. State of the Prior Art

In engineering applications calling for mechanical power transmission through a chain the problem of maintaining the correct chain tightening level over time arises. Indeed, the transmission chain tends to wear in the course of its useful life and to lengthen little by little. In addition, in the presence of mechanical systems which in addition to the changes in transmitted torque call for its reversal (as for example motorcycle primary transmission systems) the taut and slack chain branches are mutually reversed with each torque reversal (for example when changing from the motor pulling phase to the motor braking phase) and in addition chain length changes elastically in a reversible manner dependent on the torque transmitted.

Under these working conditions of the chain the tightener is required to perform various functions in order to make the chain work efficiently at all times and in particular:

it must provide for correctly tightening the normally slack branch of the chain in order to reduce its vibrations, flapping, noise and wear, it must provide for recovering the irreversible lengthening of the chain due to its natural wear in time, it must provide for recovering the reversible elastic lengthening of the chain with the changes in tension to which it is subjected in operation, and it must be capable of opposing movements or shifting which the normally slack branch of the chain would do upon reversal of the torque transmitted while withstanding the high stresses exerted by the chain thereon.

A transmission chain not correctly tightened and excessively slack produces high noise of the system and continuous flapping of the chain and these phenomena can cause considerable distress to users of the machine and considerable shortening of the useful life of the whole transmission system.

To solve the problem of chain tightening, one of the systems used is the tightener with articulated kinematic parallelogram mechanism. These systems typically comprise a tightening shoe connected to a support base by means of a connecting rod. The shoe is in sliding contact with a branch of the transmission chain and is thrust progressively against it to keep it in tension when the chain wears and becomes gradually slacker. The prior art quadrilateral tightening systems, while allowing recovery of a considerable chain lengthening, are not suited to use with transmission systems calling for reversal of the transmitted torque as for example motorcycle transmission systems. Indeed, in quadrilateral tighteners, the tightening shoe is thrust by a spring towards the chain to tighten it but is not capable of opposing chain movement when a transmitted torque reversal occurs.

To solve the problems deriving from reversal of the torque transmitted by the chain, systems comprising tightening shoes hinged at one end (traveling circular trajectories) or prismatically guided shoes (traveling rectilinear trajectories) having various nonreturn systems and thrust against the chain with spring or hydraulic action have been designed for example for motor distribution chains. But these systems allow compensation for small chain-lengthenings and opposing rather small torque reversals. They could not for example meet the requirements of a primary transmission for motorcycle use where it is necessary to be able to recover the considerable lengthenings of the chain due to wear, excessive elastic lengthenings thereof with changes in pull, and very high torque reversals when the motor changes from pulling to braking condition.

The general purpose of the present invention is to remedy the above-mentioned shortcomings by making available a power-transmission chain tightening system usable in mechanical systems calling for reversal of high transmitted torques and occupying little space and ensuring adequate and correct chain tightening level at any motor speed condition even when it is very worn and lengthened.

SUMMARY OF THE INVENTION

In view of this purpose it was sought to provide in accordance with the present invention a mechanical-power transmission-chain system comprising a mechanical tightener acting on a branch of said chain and comprising in turn a base, a tightening shoe in dragging contact with the chain, and a sliding wedge under the thrust of a first spring in an irreversible manner between the base and the shoe to cause progressive withdrawal of the base and the shoe in the chain tightening direction characterized in that between said wedge and said shoe there is an elastic thrust member for thrusting the shoe in the tightening direction.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings.

DETAILED DESCRIPTION OF THE INVENTION

Figure 1:
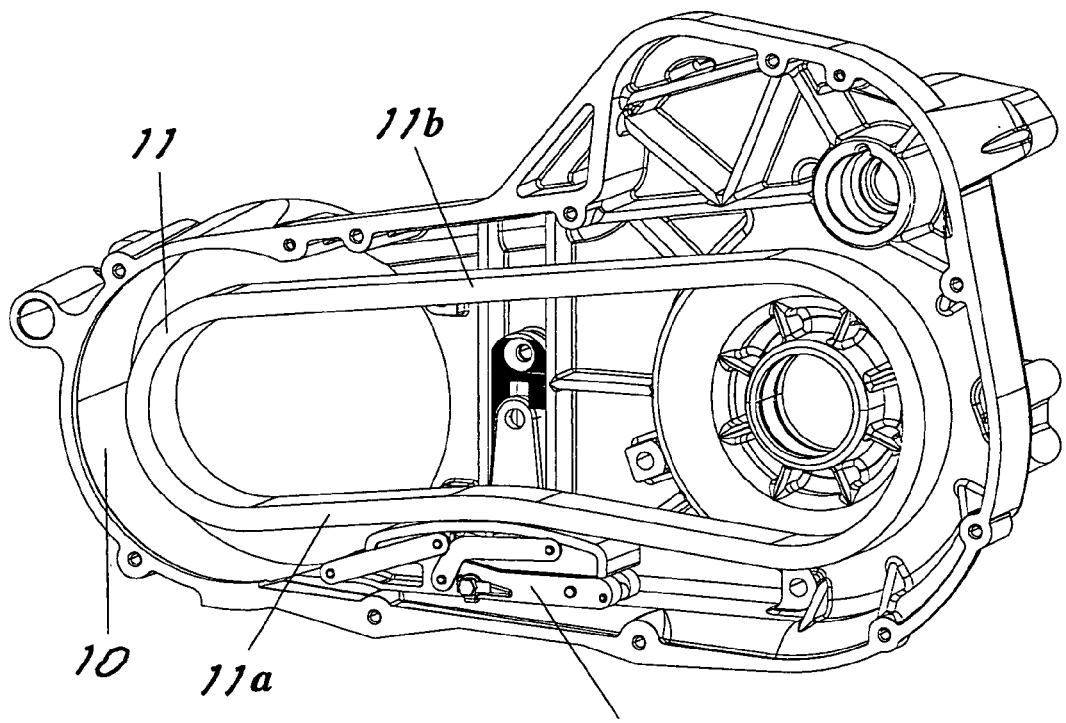
FIG. 1 shows a chain transmission system having a mechanical tightener in accordance with the present invention.
Figure 2:
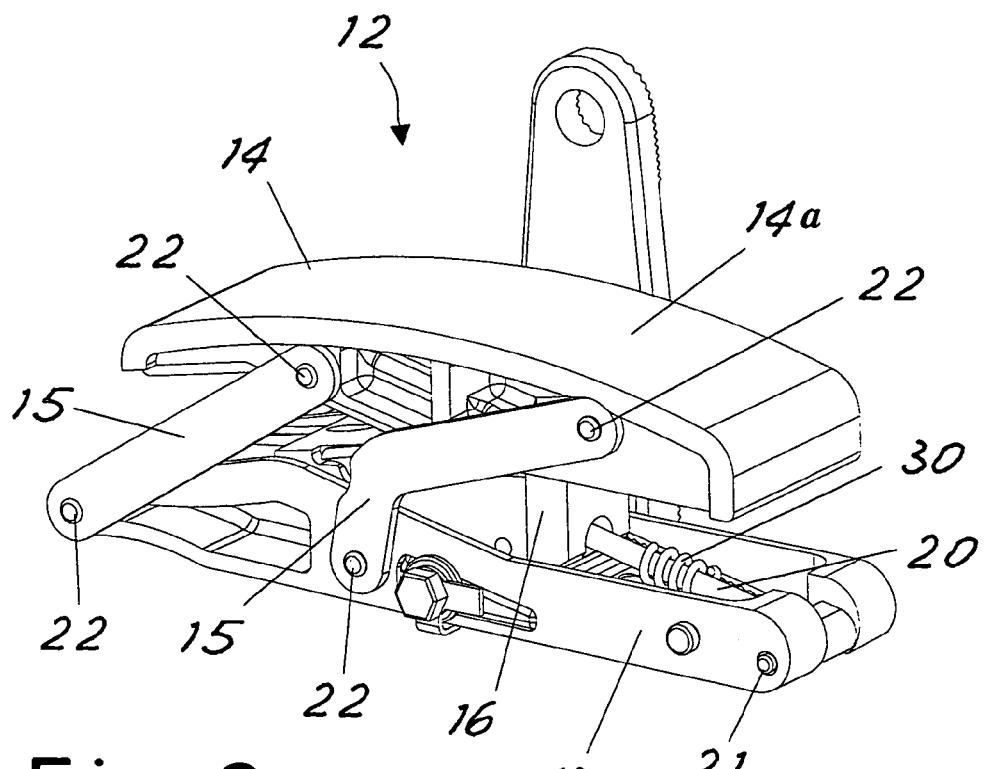
FIG. 2 shows the mechanical tightener of FIG. 1 in raised position.

FIG. 1 shows the housing 10 of the mechanical transmission system, the transmission chain 11 (diagrammatically) and a mechanical tightener 12 in accordance with the present invention. The chain 11 could be for example the primary transmission chain in a motorcycle. In this case, the mechanical torque transmitted by the chain in addition to being very high can reverse its direction. Indeed, every time there is change from the condition of pulling motor to that of braking motor or vice versa there is reversal of the torque transmitted by the chain 11 and consequently the slack branch and the taut branch of the chain are reversed. The mechanical tightener 12 is arranged between an inner wall of the housing 10 and a branch 11a (the one normally slack) of the chain 11 in order to keep it at the correct level of tightness during the entire life of the chain 11. FIG. 2 shows in detail the mechanical tightener 12. It includes a supporting base 13, a tightening shoe 14 and an operating wedge 16.

The supporting base 13 is fastened to the housing 10 of the mechanical transmission system and the tightening shoe 14 is connected to it by means of a parallelogram-type kinematic connection with four connecting rods 15 which allows movement of the shoe 14 while holding constant its orientation in space. Said parallelogram connection is prior art and not further described herein. The supporting base 13 also has a knurled and inclined upper face 19 with an indentation suited to engaging with the lower face of the operating wedge 16 as described below. At one end of the base 13 is hinged the supporting rod 20 by means of the horizontal-axis hinging 21. The operating wedge 16 has a knurled lower face which engages as above-mentioned the knurled face 19 of the supporting base 13. The particular inclination of the indentation of the two knurled faces allows rising movement of the operating wedge 16 but not descent. The wedge 16 is traversed by the supporting rod 20 and can run relatively thereto. Between the wedge 16 and a purposeful striker made on the rod 20 is mounted a spring 30 which pushes the wedge 16 upward on the inclined face 19 of the supporting base 13. The tightening shoe 14 rests on the operating wedge 16 with its lower face in such a manner as to be able to support high stresses. But with its upper face 14a it is in dragging contact with the branch 11a of the transmission chain 11 and exerts a force thereon to keep it at the correct tightening level. The upper face 14a is convex in order to optimize the coupling and reduce wear to a minimum between the shoe and the chain.

Figure 3:
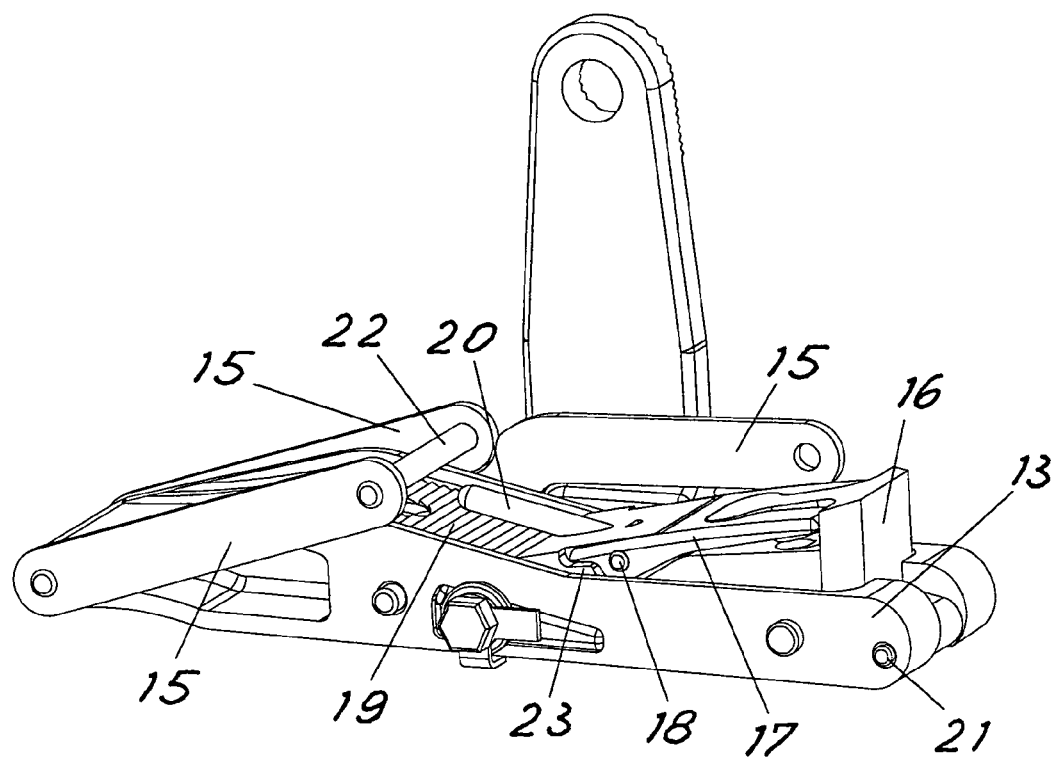
FIG. 3 shows the mechanical tightener of FIG. 1 with the upper shoe removed.
Figure 4:
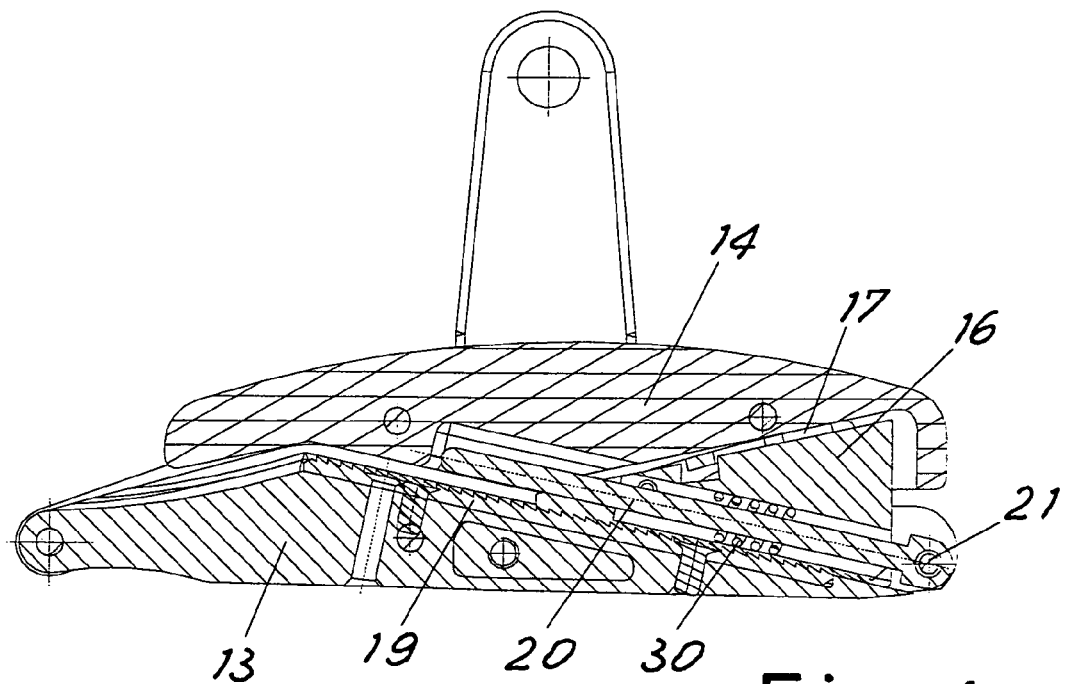
FIG. 4 shows a cross section of the mechanical tightener of FIG. 1.
Figure 5:
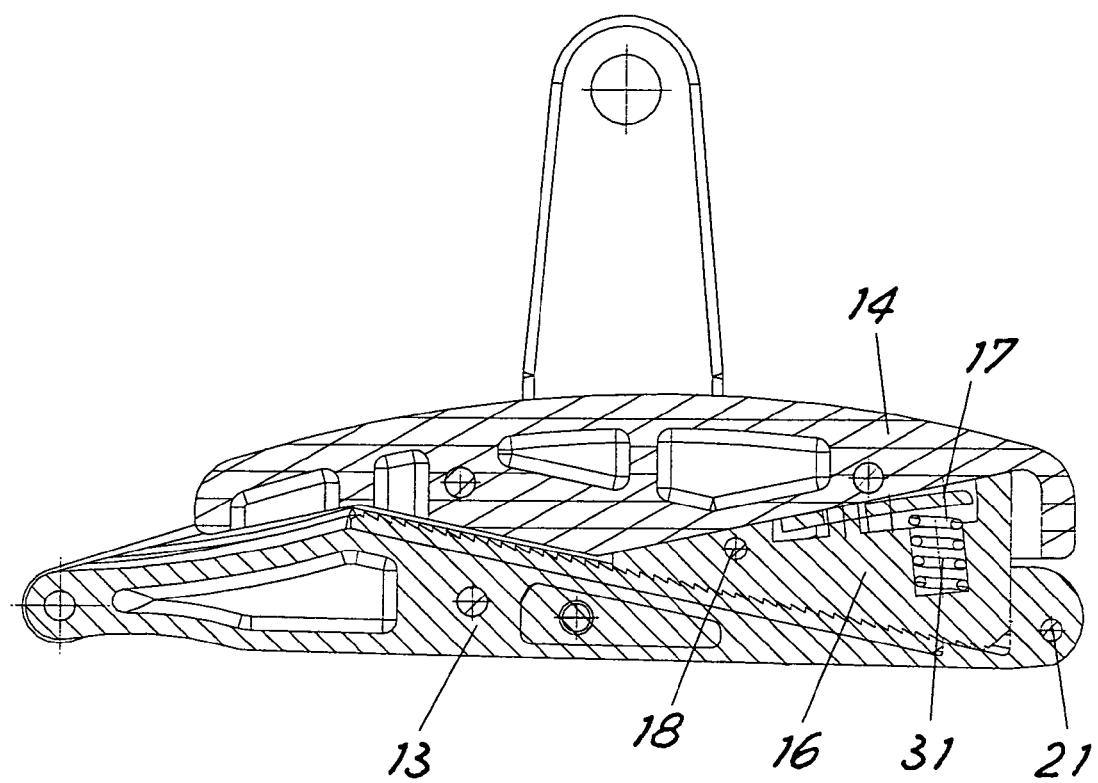
FIG. 5 shows another cross section of the mechanical tightener of FIG. 1.

A thrust lever 17 is hinged with horizontal-axis hinging 18 to the operating wedge 16 as shown in FIG. 3. Said lever 17 is thrust to withdraw from the wedge 16 by the action of two springs 31 (only one is shown in FIG. 5) installed inside operating wedge 16. On the wedge 16 is also made a striker 23 imposing an upper limit to the possible rotations of the lever 17 around the hinging 18. When the springs 31 stretch to withdraw the lever 17 from the wedge 16 the tightening shoe 14 rises from the wedge 16 going to rest with the lever 17. The elastic force exerted by the springs 31 on the operating wedge 16 is such that the spring 30 can move the wedge 16 to rise on the knurled face 19 of the base 13 only when the springs 31 have reached their maximum possible extension having thrust the lever 17 to the maximum rotation allowed by the striker 23.

It should be noted that the inclination of the connecting rods 15 and the inclination of the knurled face 19 of the supporting base 13 are such that the horizontal movements of the tightening shoe 14 and the operating wedge 16 are in the same direction when the wedge rises by one tooth on the knurled face 19 of the supporting base 13. This stratagem allows keeping an ample support surface between the wedge 16 and the shoe 14 under all operating conditions of the mechanical tightener 12 even when the chain is very worn and the tightening shoe 14 much raised. It should also be noted that the thrust lever 17 is hinged to the wedge 16 in such a manner that its direction of rotation is the same as that of the connecting rod 15 in any situation. The latter stratagem together with the preceding one allows reducing to the minimum the mechanical stresses to which the tightener 12 is subjected in general and the connecting rods 15 in particular. Indeed, sliding friction is reduced to a minimum between the various members of the tightener 12 and the internal tensions which develop at the hinging points 22 of the connecting rod are limited.

We shall now describe briefly the operation of the mechanical tightener above-mentioned.

When the transmission chain 11 is new and is not transmitting torque (for example with the motorcycle shut-down) the mechanical tightener 12 is in the lower rest configuration as shown in FIG. 1. The chain is kept at the correct level of tightening by the spring 30 which is in maximum compression condition and by the springs 31 and the mechanical tightener 12.

When a load is imposed such as to tighten the branch 11b and slacken the branch 11a (for example starting the motorcycle and accelerating it) the chain lengthens elastically and the mechanical tightener 12 enters into action. Since the elastic force component of the springs 31 in the sliding direction of the wedge 16 is greater than that of the spring 30, the first member to move between the lever 17 and the wedge 16 is the thrust lever 17. The latter, rising from the operating wedge 16, pushes the tightening shoe 14 towards the slack branch 11a of the chain 11 which is returned to the correct level of tightening. The sizing of the lever 17 and the angle of maximum rotation granted by the striker 23 are such as to tension the chain 11 without need for irreversible movement of the operating wedge 16 rising on the knurled face 19 of the support base 13. When the mechanical pull on the chain ceases, the chain shortens elastically and tends to push downward the shoe which can retreat thanks to the sprung movement of the lever 17 without uselessly keeping the chain tightened as would happen if there were only the nonreturn system. But when the pull of the chain is reversed (for example when starting or changing to the braking motor phase) the branch 11a tends to be no longer slack so as to push the tightening shoe 14 downward, compress the springs 31 and seek to cause backing of the wedge which however is held in position by the knurled face 19.

When in the course of time the chain tends to wear and lengthen, the action of the thrust lever 17 can no longer take the chain to the correct level of tightening under all operation conditions. At this point the operating wedge 16 will trip by one tooth on the knurling but without causing any excessive tightening problem. Once the wedge 16 has tripped and risen one tooth, the thrust lever 17 can again begin to tighten the chain 11 while avoiding further movements of the operating wedge 16 until the next tripping on the knurling.

In this manner, the wear and resulting lengthening of the chain are compensated for by the slow and irreversible advance of the operating wedge 16 on the knurled face 19 of the support base 13. Differently, the reversible changes of length due to the rapid and oscillating course of the tightening level due to torque changes is compensated for by the reversible movement of the thrust lever 17.

Thus with the present invention a mechanical tightener with limited space occupied and great tightenability is realized. Indeed, the tightener in accordance with the present invention has an external structure quite similar to that of the quadrilateral tighteners which typically occupy little space for their ability to compensate for even considerable chain lengthening. In addition, thanks to the insertion of the thrust lever, the problem of over-tightening which typically appears in those mechanical applications calling for considerable changes in chain pull is solved while reversal of the torques transmitted by the chain is made possible by the irreversible-movement wedge. Accordingly, it will be possible to use this tightener even in these applications.

Naturally the above description of an embodiment applying the innovative principles of the present invention is given by way of non-limiting example of said principles within the scope of the exclusive right claimed here.

What is claimed is:

1. A mechanical-power chain transmission system comprising a mechanical tightener acting on a branch of said chain and including in turn a base, a tightening shoe in dragging contact with the chain and a wedge sliding under a thrust of a first spring, in an irreversible manner between the base and the shoe to cause progressive mutual spacing of the base and the shoe in a tightening direction of the chain, and an elastic thrust member between said wedge and said shoe for elastic reversible thrust of the shoe in the tightening direction.

2. The mechanical power transmission system in accordance with claim 1, wherein the sliding of the wedge is made irreversible by a knurled engagement between the wedge and the base.

3. The mechanical power transmission system in accordance with claim 2, wherein the wedge is engaged with the base with an inclined engagement surface.

4. The mechanical power transmission system in accordance with claim 1, wherein the surface of the shoe in contact with the chain is convex.

5. The mechanical power transmission system in accordance with claim 1, wherein the elastic thrust member is a lever installed movably on the wedge and thrust against the shoe by at least one second spring bucking the wedge and limited in its movement by strikers on the wedge.

6. The mechanical power transmission system in accordance with claim 5, wherein said lever is hinged to the wedge by a hinging axis transversal to the sliding direction of the operating wedge and to a direction of movement of the tightening shoe.

7. The mechanical power transmission system in accordance with claim 6, wherein the tightening shoe is connected at the base through a kinematic parallelogram connection with four connecting rods and the direction of rotation of the connecting rods and the thrust member is the same.

8. The mechanical power transmission system in accordance with claim 5, wherein said second springs are two in number.

9. The mechanical power transmission system in accordance with claim 1, wherein the tightening shoe is connected at the base through a kinematic parallelogram connection with four connecting rods.

10. The mechanical power transmission system in accordance with claim 9, wherein the tightening shoe has movement in agreement with the sliding direction of the operating wedge.

* * * * *